(12) United States Patent
Ellison et al.

(10) Patent No.: US 10,744,682 B2
(45) Date of Patent: Aug. 18, 2020

(54) VASCULAR CHANNEL MANUFACTURE BY DEFLAGRATION

(71) Applicant: GM Global Technology Operations LLC, Detroit, MI (US)

(72) Inventors: Nicole Ellison, Madison Heights, MI (US); Anthony M. Coppola, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 15/829,051

(22) Filed: Dec. 1, 2017

(65) Prior Publication Data

US 2019/0168473 A1 Jun. 6, 2019

(51) Int. Cl.

| | | |
|---|---|---|
| B29C 33/44 | (2006.01) | |
| B22D 29/00 | (2006.01) | |
| B33Y 40/00 | (2020.01) | |
| B29C 45/44 | (2006.01) | |
| B29C 64/30 | (2017.01) | |
| B22D 19/00 | (2006.01) | |
| B29D 22/00 | (2006.01) | |
| B29C 67/00 | (2017.01) | |
| B29C 71/02 | (2006.01) | |
| B33Y 10/00 | (2015.01) | |
| B29L 31/34 | (2006.01) | |

(52) U.S. Cl.
CPC ........ B29C 33/448 (2013.01); B22D 19/0072 (2013.01); B22D 29/003 (2013.01); B29C 45/4457 (2013.01); B29C 64/30 (2017.08); B29D 22/00 (2013.01); B33Y 40/00 (2014.12); *B22D 29/007* (2013.01); *B29C 67/0033* (2013.01); *B29C 71/02* (2013.01); *B29L 2031/34* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 6,936,212 B1* | 8/2005 | Crawford | B28B 1/00 264/308 |
| 9,550,349 B1* | 1/2017 | Larsen | B32B 38/0004 |
| 9,976,815 B1* | 5/2018 | Roper | B23P 15/26 |
| 2015/0251351 A1* | 9/2015 | Feygin | B33Y 30/00 156/267 |
| 2016/0167089 A1* | 6/2016 | Ng | B33Y 10/00 |
| 2017/0137955 A1* | 5/2017 | Hofmann | C25D 5/56 |
| 2019/0030789 A1* | 1/2019 | Rhoads | C09D 11/106 |
| 2019/0160734 A1* | 5/2019 | Biesboer | B29C 64/135 |
| 2019/0170086 A1* | 6/2019 | Coppola | F02F 1/38 |
| 2019/0357386 A1* | 11/2019 | Coppola | F28F 3/12 |
| 2019/0363598 A1* | 11/2019 | Coppola | H02K 3/28 |
| 2020/0016803 A1* | 1/2020 | Coppola | B29C 45/44 |
| 2020/0025238 A1* | 1/2020 | Coppola | B29C 70/865 |

* cited by examiner

*Primary Examiner* — Benjamin A Schiffman
(74) *Attorney, Agent, or Firm* — Quinn IP Law

(57) ABSTRACT

A method of forming channels within a substrate includes: (a) molding a sacrificial component directly into the substrate; (b) igniting the sacrificial component to cause a deflagration of the sacrificial component, thereby forming a channel in the substrate; and (c) cleaning the channel in the substrate to remove byproducts of the deflagration of the sacrificial component. The sacrificial component includes a combustible material with a protective shell, and the substrate includes a polymeric material.

18 Claims, 5 Drawing Sheets

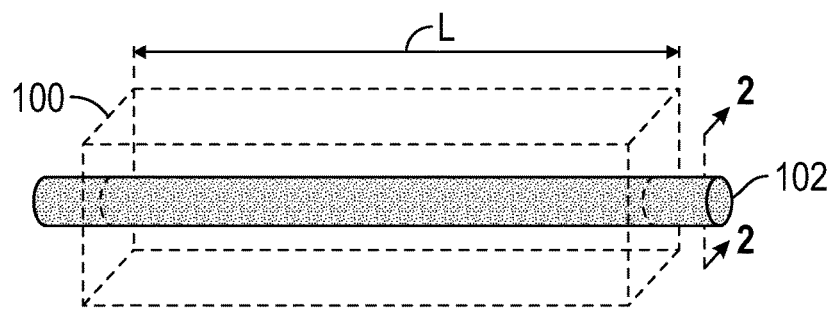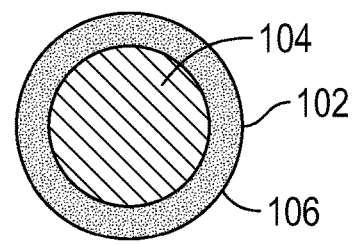
FIG. 1  FIG. 2
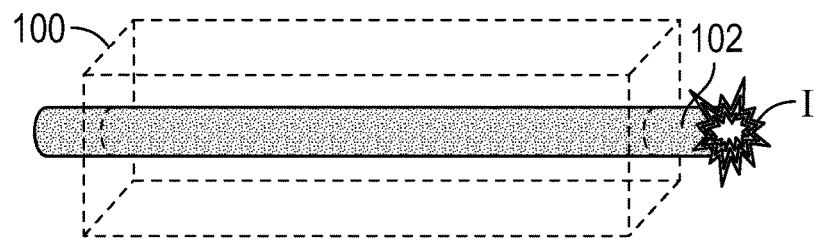
FIG. 3
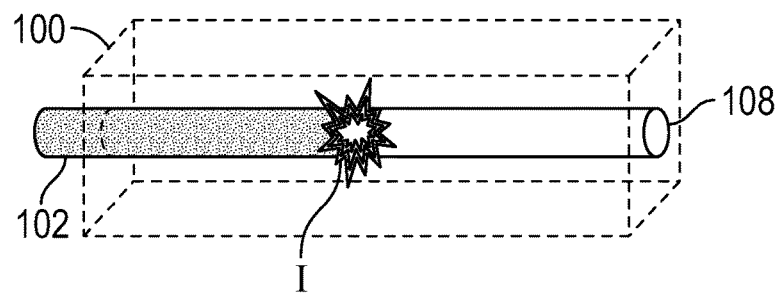
FIG. 4
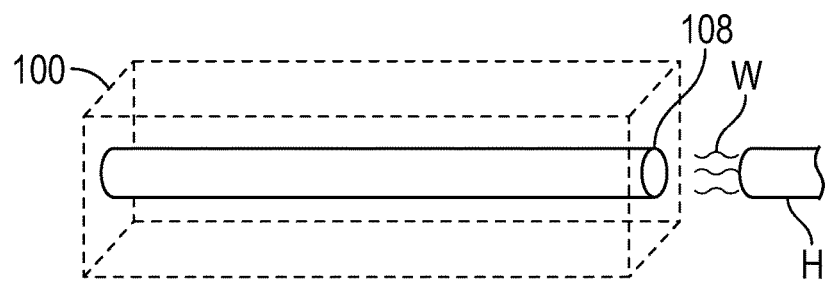
FIG. 5

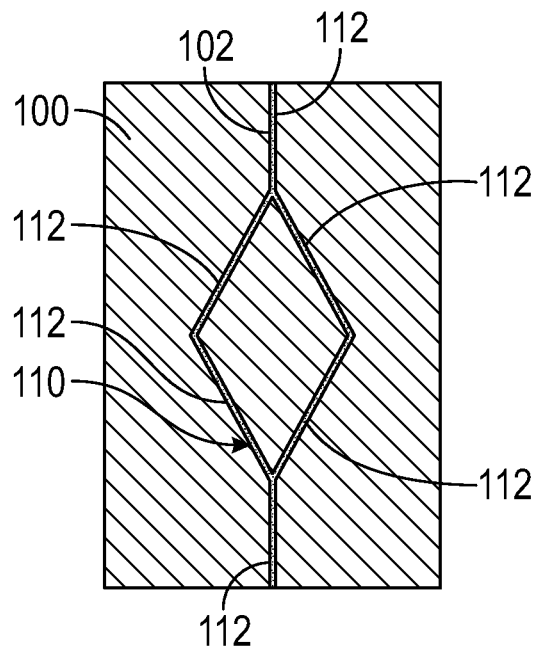
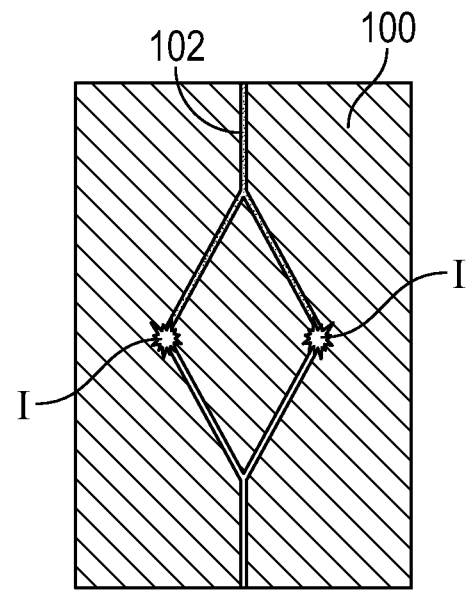
FIG. 6    FIG. 7
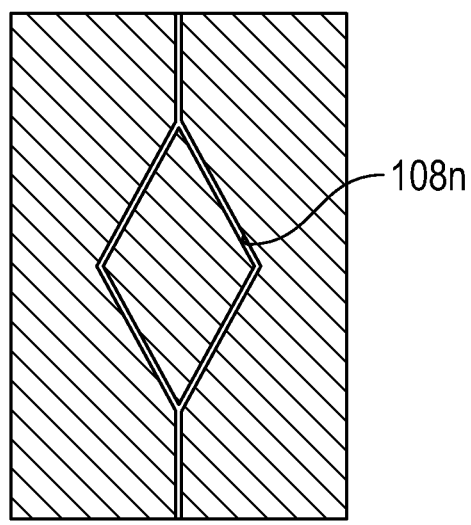
FIG. 8

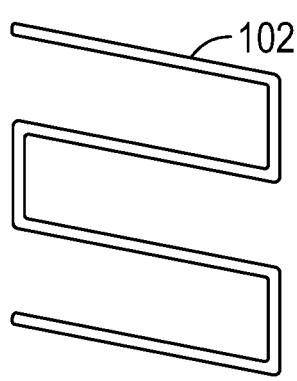
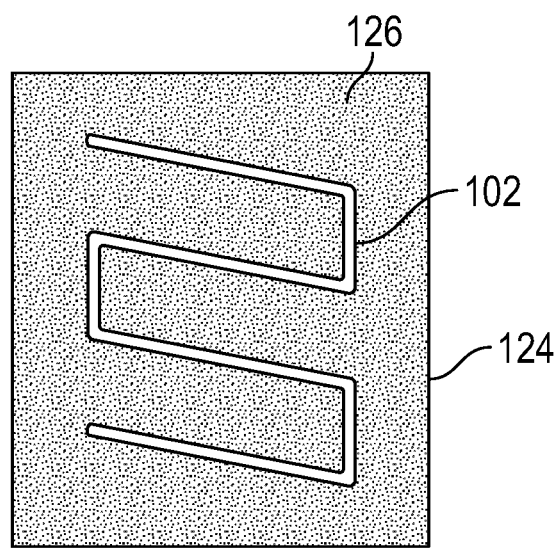
FIG. 15    FIG. 16
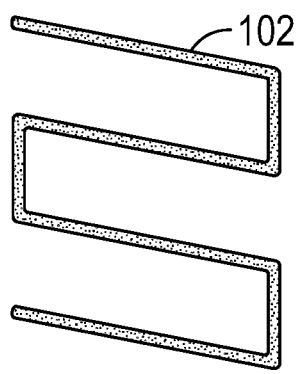
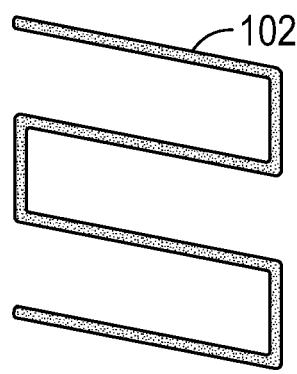
FIG. 17    FIG. 18
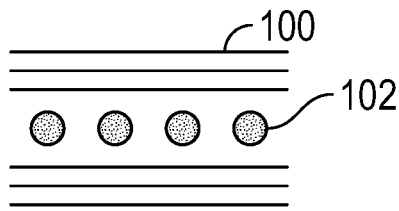
FIG. 19

VASCULAR CHANNEL MANUFACTURE BY DEFLAGRATION

INTRODUCTION

The present disclosure relates to vascular channel manufacture by deflagration. For instance, the presently disclosed method can be used for forming channels within polymers, metals, or composites using deflagration of a sacrificial material.

SUMMARY

Vascular channel manufacturing in composite materials is often challenging and slow. Previously used sacrificial materials were difficult to remove consistently. For example, the melting and/or vaporizing has been used to remove sacrificial material. However, vaporization (i.e., thermal depolymerization) and melting removal methods can be slow and tend to leave residual material in the channels. Residual materials in turn restrict fluid flow. Deflagration is a rapid process and material left behind is easily removed. Also, the deflagration process described herein does not require the entire composite to be heated, unlike melting and vaporization. Heat generated through deflagration is rapidly dissipated to minimize thermal effects to the polymer composite (or another substrate).

The present disclosure describes a method of forming channels within a substrate. In certain embodiments, the method includes: (a) molding a sacrificial component directly into the substrate; (b) igniting the sacrificial component to cause a deflagration of the sacrificial component, thereby forming a channel in the substrate; and (c) cleaning the channel in the substrate to remove byproducts of the deflagration of the sacrificial component. The sacrificial component includes a combustible material, and the substrate includes a suitable substrate material, such as a polymeric material, a reinforcing fiber (e.g., carbon fiber), and/or a metal compound. The combustible material may include black powder or any other suitable material. The black powder is a mixture of sulfur, charcoal, and potassium nitrate. The molding occurs at a processing temperature, and the processing temperature is less than the flash point of the combustible material of the sacrificial component. The sacrificial component includes a protective shell. The protective shell may include a braided fibrous material infused with a polymer. Suitable polymers include, but are not limited to, polyimide, polytetrafluoroethylene (PTFE), high-density polyethylene (HDPE), polyphenylene sulfide (PPS), polyphthalamide (PPA), polyamides (PA), polypropylene, nitrocellulose, phenolic, polyester, epoxy, polylactic acid, bismaleimides, silicone, acrylonitrile butadiene styrene, polyethylene, polycarbonate, elastomers, polyurethane, polyvinylidene chloride (PVDC), polyvinyl chloride (PVC), polystyrene (PS) and a combination thereof. Suitable elastomers include, but are not limited to, natural polyisoprene, synthetic polyisoprene, polybutadiene (BR), chloroprene rubber (CR), butyl rubber, styrene-butadiene rubber, nitrile rubber, ethylene propylene rubber, epichlorohydrin rubber (ECO), polyacrylic rubber, fluorosilicone rubber, perfluoroelastomers, polyether block amides, chlorosulfonated polyethylene, ethylene-vinyl acetate, etc. The protective shell may include a braided fibrous material infused with wax, oil, shellac resin, nitrocellulose lacquer, epoxy resin, alkyd, polyurethane, and/or a combination thereof. The method may include forming the sacrificial component using an additive manufacturing process. The additive manufacturing process is a 3D printing process. The sacrificial component is configured as a network, and the network includes filaments intersecting each other. Molding the sacrificial component directly into the substrate includes: (a) placing the sacrificial component in a mold; (b) pressurizing a polymeric resin; (c) shooting the polymeric resin into the mold; and (c) curing the polymeric resin. The method further includes coating the sacrificial component with a coat, wherein the coat includes a coating material. The coating material has a first modulus of resilience. The combustible material has a second modulus of resilience, and the first modulus of resilience is greater than the second modulus of resilience. The sacrificial component may be dip coated by dipping the sacrificial component in a container holding the coat. The method further includes removing the sacrificial component from the container and thereafter curing the coat.

In some embodiments, the method includes: (a) 3D printing a sacrificial component, wherein the sacrificial component includes a combustible material; (b) molding the sacrificial component with the substrate such that the sacrificial component is at least partially disposed inside the substrate; (c) igniting the sacrificial component to cause a deflagration of the sacrificial component, thereby forming a channel in the substrate; and (d) cleaning the channel in the substrate to remove byproducts of the deflagration of the sacrificial component. The molding step may include: (a) placing the sacrificial component in a mold; (b) pouring a metallic material into the mold; and (c) cooling the metallic material to allow the metallic material to solidify. The molding step may include: (a) placing the sacrificial component in a mold; (b) pouring a polymeric resin or metal compound into the mold; and (c) curing the polymeric resin or cooling and solidifying the metal. The channel in the body may be cleaned by introducing a liquid into the channel in the body to remove byproducts of the deflagration of the sacrificial component. Alternatively or additionally, the channel in the body may be cleaned by shooting a gas (e.g., air) into the channel in the body to remove byproducts of the deflagration of the sacrificial component. The sacrificial component includes a network, and the network includes filaments intersecting each other. The method further includes coating the sacrificial component with a coat. The coat includes a coating material. The coating material has a first modulus of resilience. The combustible material has a second modulus of resilience, and the first modulus of resilience is greater than the second modulus of resilience. The coat may include an epoxy. The molding occurs at a processing temperature, and the processing temperature is less than the flash point combustible material of the sacrificial component. The substrate includes a polymeric resin, and the processing temperature is a melting temperature of the polymeric resin.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic isometric view of a substrate molded to a sacrificial component.

FIG. 2 is a schematic sectional view of the sacrificial component, taken along section 2-2 of FIG. 1.

FIG. 3 is a schematic isometric view of the sacrificial component being ignited while still partly disposed inside the substrate.

FIG. 4 is a schematic isometric view depicting the deflagration of the sacrificial component in the substrate.

FIG. 5 is a schematic isometric view depicting a channel of the substrate being cleaned after the deflagration of the sacrificial component.

FIG. 6 is a schematic sectional view of a substrate molded to a sacrificial component, wherein the sacrificial component includes intersecting filaments.

FIG. 7 is a schematic sectional view of the substrate shown in FIG. 6, while the sacrificial component is being ignited.

FIG. 8 is a schematic sectional view of the substrate shown in FIG. 7, depicting the breached channel after the sacrificial component has been ignited.

FIG. 15 is a schematic front view of a sacrificial component formed using 3D printing.

FIG. 16 is a schematic front view of the sacrificial component of FIG. 15 being dip coated.

FIG. 17 is a schematic front view of the sacrificial component of FIG. 15 after being dip coated.

FIG. 18 is a schematic front view of the sacrificial component of FIG. 16 while the coating is being cured.

FIG. 19 is a schematic front view of the sacrificial component (after being dip coated and cured) and placed in a substrate.

DETAILED DESCRIPTION

Figure 9:
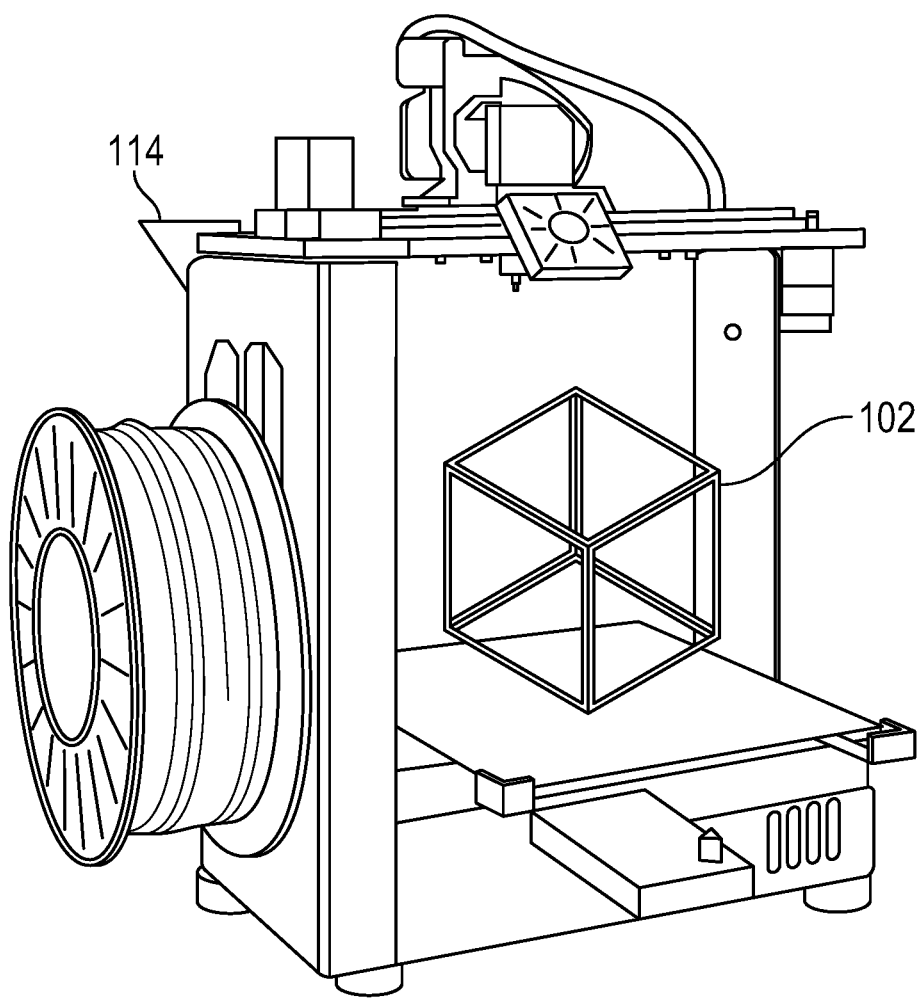
FIG. 9 is a schematic isometric view of a 3D printer creating a sacrificial component.
Figure 10:
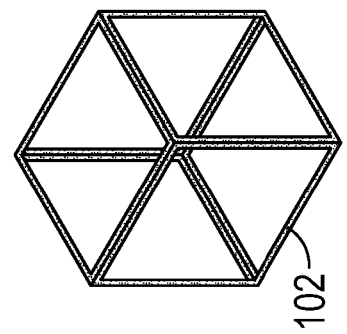
FIG. 10 is a schematic isometric view of a sacrificial component.

With reference to FIG. 1, the present disclosure describes a method of forming channels within a substrate 100 using deflagration of a sacrificial material. The substrate 100 may be wholly or partly made of a polymer or a polymer composite. In this method, a sacrificial component 102 is molded directly into the substrate 100 as shown in FIG. 1. For example, the sacrificial component 102 is molded directly to the substrate 100 such that the sacrificial component 102 is at least partially disposed inside the substrate 100. For instance, after molding, a majority of the sacrificial component 102 may be entirely disposed inside the substrate 100 to facilitate the formation of thru-holes. However, at least part of the sacrificial component 102 should be disposed outside of the substrate 100 to allow it to be ignited as discussed below.

With specific reference to FIG. 2, the sacrificial component 102 includes a combustible core 104 and a protective shell 106 surrounding the combustible core 104. The combustible core 104 allows for rapid deflagration but not detonation. The heat generated during deflagration is dissipated rapidly enough to prevent damage to the substrate 100. After deflagration, the combustible core 104 generates easy-to-remove byproducts, such as fine powdered and large gaseous components. It is contemplated that the combustible core 104 may be self-oxidizing to burn in a small diameter along long channels. The combustible core 104 is also resistant to molding pressures. Further, the combustible core 104 is shelf stable and stable during manufacturing (i.e., the flash point is greater than the manufacturing or processing temperature). The term "flash point" means the lowest temperature at which vapors of a combustible material will ignite, when given an ignition source. The sacrificial component 102 is molded directly to the substrate 100 at a processing temperature that is less than the flash point of the combustible material to avoid deflagration during the manufacturing process. The term "processing temperature" means a temperature required to perform a manufacturing operation, such as molding or casting. For example, the processing temperature may be the melting temperature of the material forming the substrate 100 (i.e., the melting temperature of the polymeric resin forming the substrate 100). The combustible core 104 is wholly or partly made of a combustible material. To achieve the desired properties mentioned above, the combustible material may be black powder (i.e., a mixture of sulfur, charcoal, and potassium nitrate). To achieve the desired properties mentioned above, the combustible material may alternatively or additionally be pentaerythritol tetranitrate, combustible metals, combustible oxides, thermites, nitrocellulose, pyrocellulose, flash powders, and/or smokeless powder. Non-combustible materials could be added to the combustible core 104 to tune speed and heat generation. To tune speed and heat generation, suitable non-combustible materials for the combustible core 104 include, but are not limited to, glass beads, glass bubbles, and/or polymer particles.

The protective shell 106 is made of a protective material, which may be non-soluble material in combustible resin (e.g., epoxy, polyurethane, polyester, among others) in order to be shelf stable and stable during manufacturing. Also, this protective material is impermeable to resin and moisture. The protective material has sufficient structural stability to be integrated into a fiber textiling and preforming process. The protective material has sufficient strength and flexibility to survive the fiber preform process. To achieve the desirable properties mentioned above, the protective material may include, for example, braided fibrous material, such as glass fiber, aramid fiber, carbon fiber, and/or natural fiber, infused with an infusion material such as a polymer or wax, oil, a combination thereof or similar material. To achieve the desirable properties mentioned above, the infused polymer may be, for example, polyimide, polytetrafluoroethylene (PTFE), high-density polyethylene (HDPE), polyphenylene sulfide (PPS), polyphthalamide (PPA), polyamides (PA), polypropylene, nitrocellulose, phenolic, polyester, epoxy, polylactic acid, bismaleimides, silicone, acrylonitrile butadiene styrene, polyethylene, polycarbonate, elastomers, polyurethane, polyvinylidene chloride (PVDC), polyvinyl chloride (PVC), polystyrene (PS) a combination thereof, or any other suitable plastic. Suitable elastomers include, but are not limited to, natural polyisoprene, synthetic polyisoprene, polybutadiene (BR), chloroprene rubber (CR), butyl rubber, styrene-butadiene rubber, nitrile rubber, ethylene propylene rubber, epichlorohydrin rubber (ECO), polyacrylic rubber, fluorosilicone rubber, perfluoroelastomers, polyether block amides, chlorosulfonated polyethylene, ethylene-vinyl acetate, shellac resin, nitrocellulose lacquer, epoxy resin, alkyd, polyurethane, etc.

With reference to FIG. 3, after molding the sacrificial component 102 directly to the substrate 100, the sacrificial component 102 is ignited. To do so, a flame may be placed in direct contact with the sacrificial component 102 to cause an ignition I. A lighter or any device capable of producing a flame can be used to ignite the sacrificial component 102.

With reference to FIG. 4, the ignition I causes deflagration of the sacrificial component 102. Deflagration converts the solid sacrificial material into gaseous and fine powder byproducts. As a consequence, a channel 108 is formed in the substrate 100. The sacrificial component 102 may be cylindrical in order to form the channel 108 with a cylindrical shape. The sacrificial component 102 may alternatively have other shapes, such as triangular, elliptical, square, etc. Further, before ignition I, the sacrificial component 102 may extend through the entire length L (FIG. 1) of the substrate 100 such that, after deflagration, the channel 108 extends through the entire length L (FIG. 1) of the substrate 100.

With reference to FIG. 5, after deflagration, the channel 108 is cleaned to remove byproducts of the deflagration of the sacrificial component 102. To do so, a liquid W, such as water, may be introduced into the channel 108 of the substrate 100 to remove byproducts of the deflagration of the sacrificial component 102. A hose H may be used to introduce the liquid W into the channel 108. A gas, such as air, may alternatively or additionally may be shot into the channel 108 to remove byproducts of the deflagration of the sacrificial component 102.

With reference to FIGS. 6-8, the method described above can be used to produce the substrate 100 with a branched channel-network 108n (FIG. 8). Accordingly, the method shown in FIG. 6-8 is substantially similar to the method described above with respect to FIGS. 1-5, except for the differences described below. In this method, the sacrificial component 102 is also molded directly to the substrate 100, but the sacrificial component 102 is configured as a network 110 including filaments 112 intersecting each other. After molding the sacrificial component 102 to the substrate 100, the sacrificial component 102 is ignited as described above to cause deflagration of the sacrificial component 102 as shown in FIG. 7, thereby producing the substrate 100 with the branched channel-network 108n as shown in FIG. 8.

With reference to FIG. 9, any of the methods described herein may further include forming the sacrificial component 102 using an additive manufacturing process to allow the formation of sacrificial component 102 with complex shapes. In the present disclosure, the term "additive manufacturing process" means a process in which a 3D object is built by adding layer-upon-layer of material. 3D printing process is a kind of additive manufacturing process. In the present disclosure, the term "3D printing process" means a process in which a 3D Computer Aided Design (CAD) model is read by a computer, and the computer commands the 3D printer 114 to add successive layers of material to create a 3D object that corresponds to the 3D CAD model. The sacrificial component 102 may use a 3D printing process (by employing the 3D printer 114) to create sacrificial components 102 with complex shapes. Accordingly, substrates 100 with channels 108 having complex shapes can be created. In this method, the sacrificial component 102 can be wholly or partly made, for example, of commercial 3D printing sugar and/or the rocket propellant known as Rocket Candy.

Figure 11:
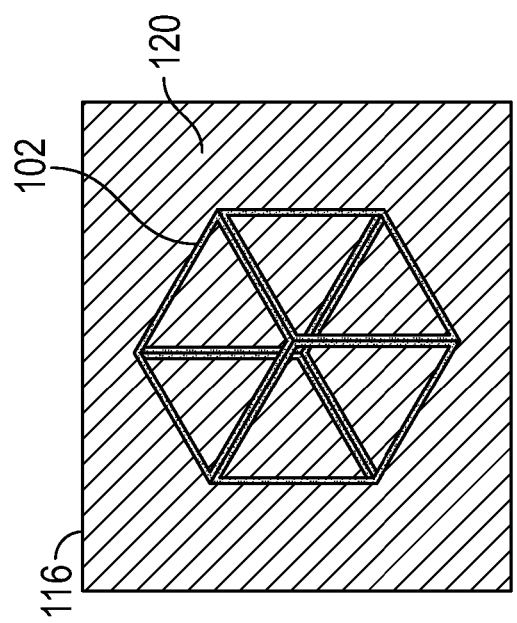
FIG. 11 is a schematic front view of the sacrificial component of FIG. 10 inside a mold.
Figure 12:
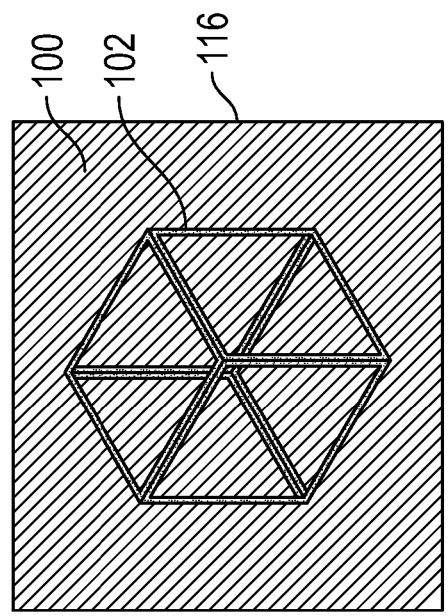
FIG. 12 is a schematic front view of the sacrificial component of FIG. 10 inside the mold, wherein resin or metal has been poured in the mold.
Figure 13:
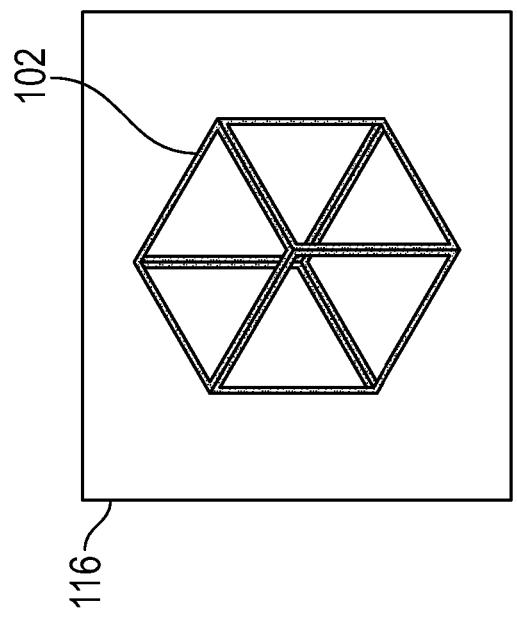
FIG. 13 is a schematic front view of the sacrificial component of FIG. 10 inside the mold after the resin has been cured or the metal has been cooled.
Figure 14:
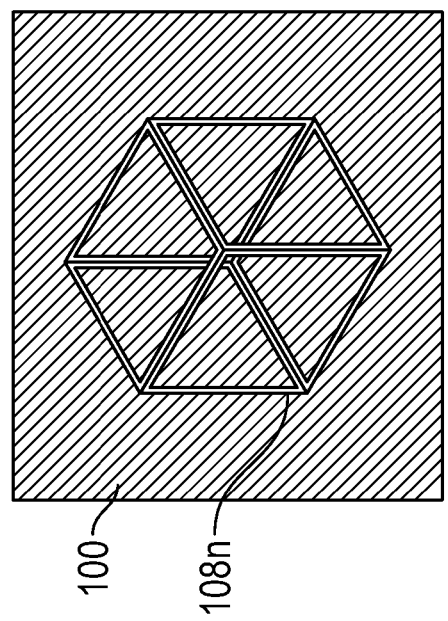
FIG. 14 is a schematic front view of the substrate after removing the sacrificial component.

With reference to FIGS. 10-14, any of the methods described herein may entail first forming the sacrificial component 102 as described above. In order to achieve a complex shape, the sacrificial component 102 may be created using the 3D printing process described above. Then, the sacrificial component 102 is placed inside a mold 116 as shown in FIG. 11. Next, a resin or liquid metallic material 120 is poured in the mold 116 as shown in FIG. 12. Then, the resin is cured (through, for example, heating for a predetermined amount of time at a predetermined curing temperature) or the metallic material is cooled (for a predetermined amount of time) to form the substrate 100. The metallic material 120 is cooled until it solidifies to form the substrate 100 as shown in FIG. 13. Next, the sacrificial component 102 and the substrate 100 are removed from the mold 116, and then the sacrificial component 102 is removed (through deflagration as described above) as shown in FIG. 14. By employing this process, substrates 100 with a branched channel-network 108n having a complex shape can be created with low-pressure cast materials, such as low-temperature metals and polymers.

With reference to FIGS. 15-20, the sacrificial component 102 can be formed using a 3D printing process as described below (see FIG. 15). Then, the sacrificial component 102 is coated with a coat 126 (see FIG. 16). For example, the sacrificial component 102 may be dipped in a container 124 holding the coat 126. In other words, the sacrificial component 102 is dip coated. The coat 126 is wholly or partly made of a coating material. The modulus of resilience of the coating material (i.e., the first modulus of resilience) is greater than the modulus of resilience of the combustible material of the sacrificial component 102 (i.e., the second modulus of resilience) in order to enhance the durability of the sacrificial material 102 during the manufacturing process. For example, the coating material may be a toughened epoxy. Because of its resilience, the coat 126 allows the sacrificial component 102 to be used in higher pressure manufacturing, such as for continuous fiber composites. After dip coating the sacrificial component 102, the sacrificial component 102 is removed from the container 124 as shown in FIG. 18. Then, the coat 124 is cured (through, for example, heating at a curing temperature for a predetermined curing time) as shown in FIG. 19. Next, the sacrificial component 102 (with the coat 126) may be embedded in the substrate 100 (through molding as described above).

The methods described above may be used to manufacture vascular cooled potted electronics. For example, the presently disclosed methods could be used to manufacture an engine control unit or touch screen on an instrument. This method solely heats the polymer locally, as opposed to other methods that require the entire component to be heated to remove the sacrificial material. Thus, the presently disclosed methods allow vascular manufacturing in heat sensitive electronics. Further, the presently disclosed methods can be used to manufacture biomedical implants. For example, the methods described herein could use 3D printing of sugar and, thereafter, rapidly removing the sugar. Moreover, the presently disclosed methods can be used to make battery enclosures and cooling fins in a most cost-effective manner by rapidly increasing the manufacturing rate. Further, the presently disclosed method can be used to manufacture vascular engines and motors in a more cost-effective manner in comparison with other manufacturing methods.

While the best modes for carrying out the disclosure have been described in detail, those familiar with the art to which this disclosure relates will recognize various alternative designs and embodiments for practicing the disclosure within the scope of the appended claims.

What is claimed is:
1. A method of forming channels within a substrate, comprising:
    molding a sacrificial component directly into the substrate;

igniting the sacrificial component to cause deflagration of the sacrificial component, thereby forming a channel in the substrate;

cleaning the channel in the substrate to remove byproducts of the deflagration of the sacrificial component;

wherein the molding of the sacrificial component directly into the substrate includes:
placing the sacrificial component in a mold;
pressurizing a polymeric resin;
shooting the polymeric resin into the mold; and
curing the polymeric resin.

2. The method of claim 1, wherein molding the sacrificial component directly into the substrate occurs at a processing temperature, the sacrificial component includes a combustible material, the combustible material has a flash point, the processing temperature is less than the flash point of the combustible material, and the substrate includes a substrate material selected from a group consisting of a polymeric material, a reinforcing fiber, and a metal compound.

3. The method of claim 2, wherein the combustible material is selected from a group consisting of black powder, pentaerythritol tetranitrate, combustible metals, combustible oxides, thermites, nitrocellulose, pyrocellulose, flash powders, and smokeless powder.

4. The method of claim 3, wherein the sacrificial component includes a protective shell, and the protective shell includes a braided fibrous material.

5. The method of claim 4, wherein the braided fibrous material is infused with an infusion material selected from a group consisting of a polymer, wax, oil, and a combination thereof.

6. The method of claim 5, wherein the polymer is selected from a group consisting of polyimide, polytetrafluoroethylene (PTFE), high-density polyethylene (HDPE), polyphenylene sulfide (PPS), polyphthalamide (PPA), polyamides (PA), polypropylene, nitrocellulose, phenolic, polyester, epoxy, polylactic acid, bismaleimides, silicone, acrylonitrile butadiene styrene, polyethylene, polycarbonate, elastomers, polyurethane, polyvinylidene chloride (PVDC), polyvinyl chloride (PVC), polystyrene (PS), shellac resin, nitrocellulose lacquer, epoxy resin, alkyd, polyurethane, and a combination thereof.

7. The method of claim 1, wherein the sacrificial component includes a protective shell, and the protective shell includes a polymer casing.

8. The method of claim 1, further comprising forming the sacrificial component using an additive manufacturing process.

9. The method of claim 8, wherein the additive manufacturing process is a 3D printing process.

10. The method of claim 9, wherein the sacrificial component is configured as a network, and the network includes filaments intersecting each other.

11. The method of claim 10, further comprising coating the sacrificial component with a coat, wherein sacrificial component includes a combustible material, the coat includes a coating material, the coating material has a first modulus of resilience, the combustible material has a second modulus of resilience, and the first modulus of resilience is greater than the second modulus of resilience.

12. The method of claim 11, wherein coating the sacrificial component with the coat including dipping the sacrificial component in a container holding the coat.

13. The method of claim 12, further comprising removing the sacrificial component from the container and thereafter curing the coat.

14. A method of forming channels within a substrate, comprising:
molding a sacrificial component directly into the substrate;
igniting the sacrificial component to cause deflagration of the sacrificial component, thereby forming a channel in the substrate;
cleaning the channel in the substrate to remove byproducts of the deflagration of the sacrificial component;
wherein the molding of the sacrificial component directly into the substrate includes:
placing the sacrificial component in a mold;
pouring a metallic material into the mold; and
cooling the metallic material to allow the metallic material to solidify.

15. A method of forming channels within a substrate, comprising:
3D printing a sacrificial component, wherein the sacrificial component includes a combustible material, and the combustible material has a flash point;
molding the sacrificial component with the substrate such that the sacrificial component is at least partially disposed inside the substrate, wherein the molding occurs at a processing temperature, and the processing temperature is less than the flash point;
igniting the sacrificial component to cause a deflagration of the sacrificial component, thereby forming a channel in the substrate; and
cleaning the channel in the substrate to remove byproducts of the deflagration of the sacrificial component; and
wherein cleaning the channel in the substrate includes introducing a liquid into the channel in the substrate to remove byproducts of the deflagration of the sacrificial component.

16. The method of claim 15, wherein the molding of the sacrificial component with the substrate includes:
placing the sacrificial component in a mold;
pouring a metallic material into the mold; and
cooling the metallic material.

17. The method of claim 15, wherein the molding of the sacrificial component with the substrate includes:
placing the sacrificial component in a mold;
pouring a polymeric resin into the mold; and
curing the polymeric resin.

18. The method of claim 15, wherein cleaning the channel in the substrate includes shooting a gas into the channel in the substrate to remove byproducts of the deflagration of the sacrificial component.

\* \* \* \* \*